(12) United States Patent  
McClintic

(10) Patent No.: US 8,755,965 B1
(45) Date of Patent: Jun. 17, 2014

(54) UNMANNED VEHICLE SIMULATOR BASED CONTROL METHODS AND APPARATUS

(76) Inventor: Frank McClintic, Toms River, NJ (US)

( * ) Notice: Subject to any disclaimer, the term of this patent is extended or adjusted under 35 U.S.C. 154(b) by 81 days.

(21) Appl. No.: 13/429,431

(22) Filed: Mar. 25, 2012

Related U.S. Application Data

(60) Provisional application No. 61/467,680, filed on Mar. 25, 2011.

(51) Int. Cl.
*G05D 1/00* (2006.01)
(52) U.S. Cl.
USPC .................................................. 701/23
(58) Field of Classification Search
USPC ................ 701/23; 700/245; 244/190, 2, 3.15, 244/158.1
See application file for complete search history.

(56) References Cited

U.S. PATENT DOCUMENTS

| 6,050,823 | A * | 4/2000 | McClintic ...................... 434/29 |
| 6,588,701 | B2 * | 7/2003 | Yavnai ........................ 244/23 A |
| 6,902,402 | B2 * | 6/2005 | McClintic ...................... 434/30 |
| 7,873,444 | B1 * | 1/2011 | Ehrmantraut et al. ........... 701/2 |
| 8,066,226 | B2 * | 11/2011 | Fiala et al. ................. 244/171.5 |
| 2002/0060267 | A1 * | 5/2002 | Yavnai ........................ 244/23 A |
| 2010/0084513 | A1 * | 4/2010 | Gariepy et al. ............... 244/190 |

* cited by examiner

*Primary Examiner* — Yonel Beaulieu
(74) *Attorney, Agent, or Firm* — Straub & Pokotylo; Michael P. Straub; Stephen T. Straub

(57) ABSTRACT

A mobile and versatile vehicle simulator is integrated with a vehicle control system to provide a mobile simulator based vehicle control system such as the exemplary system. The vehicle simulators included in the simulator based control system allows for a vehicle operator to be moved in two or even three axis of rotation while, in some embodiments, also allowing for sudden jolts or motion similar to what might be encountered when a pilot encounters air turbulence or a driver encounters ruts or pot holes.

20 Claims, 9 Drawing Sheets

UNMANNED VEHICLE SIMULATOR BASED CONTROL METHODS AND APPARATUS

RELATED APPLICATIONS

The present application claims the benefit of U.S. Provisional Patent Application Ser. No. 61/467,680 filed Mar. 25, 2011 which has the same title as the present application and is related to U.S. Provisional Patent Application Ser. No. 61/615,338 filed Mar. 25, 2012 which has the same title as the present application, both of said application hereby being expressly incorporated by reference in their entirety.

FIELD

Various embodiments are directed to methods and apparatus for controlling unmanned vehicles, and more specifically, to simulator based control of unmanned vehicles.

BACKGROUND

Unmanned aerial vehicles have been growing in importance for a wide variety of purposes from inspection operations for industrial sites, surveillance applications, to the actual delivery of military ordinance in areas of armed conflict. Unmanned vehicles are often controlled via a control interface that often takes the form of a display screen and control console very similar to that found in video games. While the vehicle being controlled and the actions taken by a vehicle are very real, the operator sitting in a chair controlling the vehicle is often limited to visual and/or audio input and does not have a physical sense for how the vehicle is moving. This lack of tactile input and lack of a sense of actual physical motion which a pilot of a manned vehicle feels, results in the operator of a unmanned vehicle having a much lower sense of vehicle motion. In addition, the vehicle operation has little sense of personal presence as compared to the case where a human is in a cockpit and is shaken by air turbulence and feels the motion induced by operation of the operator controls.

It should be appreciated that it would be desirable if operator control of unmanned vehicles could be improved so that they were closer to the feel, including the feel of actual vehicle motion. In particular, it would be desirable if an operator of an unmanned vehicle could be made to feel the motion of the vehicle and thereby obtain a sense of presence normally felt by an operator of a manned vehicle.

In view of the above discussion, it should be appreciated that there is a need for improved methods and apparatus for controlling unmanned vehicles whether they be aerial vehicles, land vehicles or water based vehicles.

SUMMARY

A mobile and versatile vehicle simulator is integrated with a vehicle control system to provide a mobile simulator based vehicle control system such as the exemplary system. The vehicle simulators included in the simulator based control system allows for a vehicle operator to be moved in two or even three axis of rotation while, in some embodiments, also allowing for sudden jolts or motion similar to what might be encountered when a pilot encounters air turbulence or a driver encounters ruts or pot holes. The rotation supported in the one, two or three axis of rotation is 360 degrees in some but not necessarily all embodiments. For example, in some embodiments an operation position, e.g., the seat and/or control panel at which in operator is positioned, has unlimited pitch and roll in terms of the degrees of motion which are supported. In another embodiment the operator position has unlimited pitch, roll, and yaw. In still another embodiment the operator position has unlimited pitch, roll and yaw and the operator position can also be subjected to vertical and/or horizontal thrust, e.g., of short durations, which can be used to simulate bumps and/or rapid changes in position in those directions.

Motion of the one or more vehicle simulators, each simulator including a moveable operator position and control panel is adjusted based on operator, e.g., pilot, input and also feedback from the vehicle being controlled indicating actual vehicle motion and/or external forces such as wind or impacts detected by one or more vehicle mounted sensors. The operator is provided with realistic motion corresponding to the actual motion being encountered by the vehicle being controlled. Thus, an operator is provided motion feedback and can feel turbulence/angle of decent and/or other vehicle conditions that a pilot would sense if actually present in the vehicle being controlled enhancing an operators ability to sense vehicle conditions and control the vehicle accordingly. Significantly, in various embodiments the operator is positioned in the simulator so that the operator's body is facing in the same direction as the nose and/or front of the vehicle being operated and in the same position relative to the ground. Thus, the operator can determine from the physical sensation on his/her body the orientation of the vehicle being controlled even without visual input.

In some but not necessarily all embodiments, the simulator does not subject the operator to maneuvers which are so rapid that they would disorient the operator, e.g., pilot. In at least some such embodiment, the operator is able to determine his orientation in G even with his eyes closed. In at least one such embodiment the simulator does not introduce significant G forces beyond those provided by gravity and thus the operator is not subject to forces significantly beyond 1 G. In such embodiments the operator, e.g., pilot, does not become disoriented. In contrast a pilot sitting in a flying aircraft performing a high speed maneuver may be subject to G forces associated with the high speed maneuver that might cause pilot disorientation. Disorienting G forces can be several times 1 G.

In some but not necessarily all embodiments the acceleration to which the pilot is subjected is limited, e.g., constrained, to avoid operator disorientation.

In some but not necessarily all embodiments the sustained G forces are limited to a predetermined maximum with, in some embodiments the sustained maximum being limited to less than a few G's. While the operator position is in a fixed orientation the G force on the pilot is a level of approximately 1 G and the operator can sense his/her orientation relative to the direction of local gravity. Thus, while the simulator will normally point in the direction the noise and/or front of an unmanned vehicle is pointing, roll and/or other rotations may be limited so that the operator, e.g., pilot, does not become disoriented while still allowing the operator to sense from his body position the general direction and motion, e.g., rotation and/or changed in angle a vehicle is being subjected to. Thus an operator may be able to sense that a UAV is rotating in a particular direction and/or that the UAV is angled in a particular direction without the operator becoming disoriented allowing the operator to take the correct corrective action based, at least in part, on the orientation and motion of his/her body in the simulator in a manner that corresponds to the motion of the UV being piloted/controlled. Thus, in at least some embodiments, the simulator based UV controller of the present invention avoids a possible upset scenario which could be encountered should the vehicle motion create a visual blur and/or the instrumentation were allowed to move too fast so that it became unreadable and/or caused a visual disorientation. In the simulator of the present invention the operator, e.g., pilot, is able to sense the vehicle's relative position and direction(s) of motion reducing the need to rely on visual input and allowing the operator to have an accurate sense, e.g., feel, of the vehicle changes in orientation, albeit in some cases at a lower non-disorientating rate, without the disorientation that might be encountered in an actual flight. Thus, in accordance with the present invention a pilot of a UAV could sense the UAVs orientation relative to the earth, e.g., based on G forces exerted on the pilot's body in the simulator, even with his eyes closed. Short term acceleration, e.g., simulating short sudden changes in elevation and/or simulation shocks, may exceed the acceleration limit used to control the sustained G forces a pilot and/or other operator may be subjected to. Thus, it should be appreciated that the simulator control of the present invention offers the advantages of being able to sense vehicle position, orientation relative to ground and/or rotation, e.g., angle of roll and angle of pitch and/or rotational rates, without subjecting the operator, e.g., pilot, to disorientating forces. Visual displays may, and in some embodiments are, also limited in their rate of change to avoid visual disorientation of the pilot and/or to avoid changes in displayed information becoming so rapid that they are difficult to interpret in a useful way. The vehicle simulator used in some embodiments may be the same as, or similar in terms of hardware configuration and pilot positioning, to the simulators described in U.S. Pat. Nos. 6,902,402 and/or 6,050,823 both of which are hereby expressly incorporated by reference in their entirety. Note that in some but not necessarily all embodiments the operator position is located forward of a pitch axis providing for a more realistic sense of vehicle orientation than may be obtained from some other simulators which do not position the operator, e.g., pilot, in such a manner.

An exemplary vehicle control system, in accordance with some embodiments, comprises: an unmanned vehicle control module for controlling at least a first unmanned vehicle; a first vehicle simulator coupled to said control module, said vehicle simulator including a first operator position and a first control interface for receiving operation input used to control said first unmanned vehicle, said vehicle simulator including actuators for moving said operator position in at least two dimensions in a manner simulating motion of the unmanned vehicle being controlled; a receiver for receiving signals from said unmanned vehicle; and a transmitter for transmitting vehicle control signals to said unmanned vehicle. An exemplary method of controlling at least a first unmanned vehicle, in accordance with some embodiments comprises: receiving signals from said unmanned vehicle; operating an unmanned vehicle control module to control at least said first unmanned vehicle; and operating a first vehicle simulator control module used to control a first vehicle simulator. The first vehicle simulator includes a first operator position and a first control interface, and operating a first vehicle simulator includes: receiving input used to control said first unmanned vehicle; and controlling movement of the first operator position in at least two dimensions in a manner simulating motion of the unmanned vehicle being controlled.

Numerous additional features, benefits and embodiments are discussed in the detailed description which follows. While various embodiments have been discussed in the summary above, it should be appreciated that not necessarily all embodiments include the same features and some of the features described above are not necessary but can be desirable in some embodiments.

DETAILED DESCRIPTION

Figure 1:
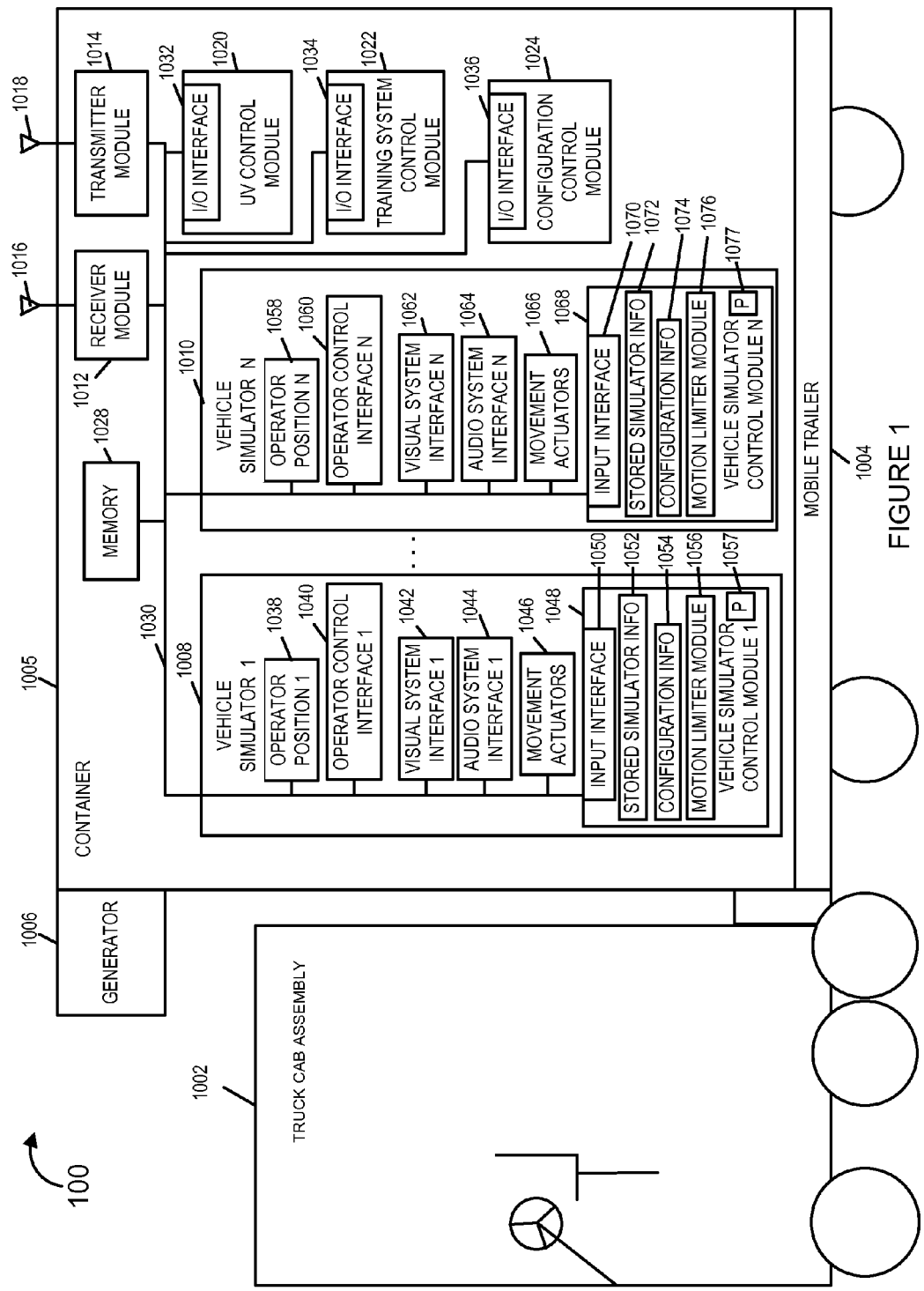
FIG. 1 illustrates a mobile unmanned vehicle control system implemented in accordance with one embodiment of the present invention.

In accordance with various embodiments of the present invention a mobile and versatile vehicle simulator is integrated with a vehicle control system to provide a mobile simulator based vehicle control system such as the exemplary system 100 shown in FIG. 1. The vehicle simulators included in the simulator based control system allow for a vehicle operator to be moved in two or even three axis of rotation while, in some embodiments, also allowing for sudden jolts or motion similar to what might be encountered when a pilot encounters air turbulence or a driver encounters ruts or pot holes. Vehicle simulators which may be used in accordance with the present invention as part of the vehicle control system of the present invention include simulators which are the same as or similar to those described in U.S. Pat. No. 6,902, 402 which is hereby expressly incorporated by reference in its entirety.

Exemplary unmanned vehicle control system 100 includes a truck cab assembly 1002, a mobile trailer 1004, a container 1005 and a generator 1006. In some embodiments, the container 1005 and mobile trailer 1004 are a single unit. In some embodiments the container is removable from the mobile trailer 1004. Container 1005 is mounted on mobile trailer 1004. Container 1005 includes a plurality of vehicle simulators (vehicle simulator 1 1008, . . . , vehicle simulator N 1010), a receiver module 1012, a transmitter module 1014, an unmanned vehicle (UV) control module 1020, a training system control module 1022, a configuration control module 1024, and memory 1028, coupled together via a bus 1030 over which the various elements may exchange data and information. The system 100 further includes a receive antenna 1016 and a transmit antenna 1018 which are mounted on container 1005 and coupled to receiver module 1012 and transmitter module 1014, respectively. In some embodiments, there are multiple antennas, different transmitter, and/or different receivers corresponding to different frequency communications links supported. Some antenna may be directional antennas, e.g., for supporting communications via a satellite link.

UV control module 1020 includes an I/O interface 1032. UV control module 1020 can control a plurality of unmanned vehicles. UV control module 1020 interfaces with the transmitter and 1014 and receiver 1012 via its interface 1032. UV control module 1020 also interfaces with the vehicle simulator control modules (1048, . . . , 1068), via its interface 1032. UV control module 1020 communicates commands to an unmanned vehicle generated based on operator input entered via a control interface, e.g., operator control interface 1 1040, and communicates feedback information, including at least some position information to a vehicle simulator control module, e.g., vehicle simulator control module 1 1048. The unmanned vehicle control module 1020 supports handoff of control of an unmanned vehicle from a first operator position of a first UV simulator to a second operator position of a second UV simulator. UV control module 1020 supports first and second operator positions controlling first and second unmanned vehicles, respectively, at the same time. Sometimes, one of the first and second unmanned vehicles is a land vehicle and another one of the vehicles is an aerial vehicle.

Training system control module 1022 includes an I/O interface 1034. Training system control module 1022 is configured to simulate an unmanned vehicle. In some embodiments, the training system control module 1022 is further configured to simulate the UV control module 1020.

Configuration control module 1024 includes an I/O interface 1036. Configuration control module 1024 controls a vehicle simulator to switch from simulation one type of vehicle to another type of vehicle. For example, configuration control module controls vehicle simulator 1 1008 to switch from simulating a land vehicle to simulating an aerial vehicle. Configuration control module 1024 interfaces with vehicle simulation control modules. Configuration control module 1024 controls a vehicle simulator to switch from simulation one type operator position of a vehicle to a different type of operator position of the vehicle. For example, configuration control module 1024 controls vehicle simulator 1 1008 to switch from simulating a pilot operator position of a UAV to a weapons officer operator position of the UAV.

Vehicle simulator 1 1008 includes operator position 1 1038, operator control interface 1 1040, visual system interface 1 1042, audio system interface 1 1044, movement actuators 1046 and vehicle simulator control module 1 1048. Vehicle simulator control module 1 1048 includes an input interface 1050, stored simulator information 1052, configuration information 1054, a motion limiter module 1056, and a processor 1057.

In some embodiments, a visual system interface, e.g., visual system interface 1042, includes multiple camera displays corresponding to more angles than are viewable from a forward facing position. In some embodiments, a visual system interface, e.g., visual system interface 1042, includes at least one telescopic system display. In some embodiments, the telescopic system display includes at least one of targeting acquisition display or a collision avoidance display.

The motion limiter 1056 is configured to control motion of the operator position 1038 within preset limits when motion of the unmanned vehicle exceeds the preset limits. In some embodiments, the preset limits correspond to limits which are motion disorientation prevention limits. In some embodiments, the operator control interface, e.g., operator control interface 1 1040 includes an input for activating the motion limiter module, e.g., module 1056.

Vehicle simulator N 1010 includes operator position N 1058, operator control interface N 1060, visual system interface N 1062, audio system interface N 1064, movement actuators 1066 and vehicle simulator control module N 1068. Vehicle simulator control module N 1068 includes an input interface 1070, stored simulator information 1072, configuration information 1074, a motion limiter module 1076, and a processor 1077. The motion limiter 1076 is configured to control motion of the operator position 1058 within preset limits when motion of the unmanned vehicle exceeds the preset limits.

Motion of the one or more vehicle simulators (1008, . . . , 1010), each simulator including a moveable operator position (1038, . . . , 1058) and operator control interface, e.g., control panel, (1040, . . . , 1060), respectively, is adjusted based on operator, e.g., pilot, input and also feedback from the vehicle being controlled indicating actual vehicle motion and/or external forces such as wind or impacts detected by one or more vehicle mounted sensors. The operator is provided with realistic motion corresponding to the actual motion being encountered by the vehicle being controlled. Thus, an operator is provided motion feedback and can feel turbulence/angle of decent and/or other vehicle conditions that a pilot would sense if actually present in the vehicle being controlled.

A vehicle simulator control module include stored vehicle simulator information and an input interface for receiving input from an operator in its operator position via a control interface and for receiving information obtained from an unmanned vehicle. The vehicle simulator control module is configured to move its operator position based on movement of the unmanned vehicle is expected to perform in response to a control signal from the operator in its operator position. The vehicle simulator control module is further configured to move its operator position based on movement of the unmanned vehicle detected by the unmanned vehicle and communicated to the vehicle simulator control module.

The movement of an unmanned vehicle is sometimes due to an external condition affecting the unmanned vehicle. The external condition may be, and sometimes is, a weather related condition. In some embodiments, the external condition is wind force. In some embodiments, a vehicle simulator control module includes stored information for simulating motion corresponding to a plurality of different unmanned vehicles.

In some embodiments, the vehicle simulator (1008, . . . , 1010) including the operator position (1038, . . . , 1050), e.g., pilot or driver's set, and corresponding control interface (1040, . . . , 1052), respectively, is mounted in a moveable vehicle, e.g., a container portion 1005 of the trailer portion 1004 of a tractor trailer or on a larger truck or tracked vehicle. Power for the simulator is supplied by a generator 1006 associated with or mounted on the moveable vehicle. In some embodiments, the generator is included with the container 1005. In some embodiments, external inputs are included for sourcing power from a local power source, e.g., for interfacing to the local power grid or receiving power from another generator, e.g., a standalone generator unit or a shipboard generator.

The vehicle simulator 100 can include a variety of simulator modules configured to simulate and control different vehicles. Thus, the same physical simulator can be used to control land vehicles as well as aerial vehicles with the range of motion to which the operator is subjected being determined based on the range and types of motion which are encountered by the vehicle being controlled.

Unmanned vehicles can often operate for extended periods of time. To support continuous and/or near continuous manned operator control of an unmanned operator vehicle, a control system implemented in accordance with one aspect includes multiple simulators, e.g., a first simulator 1008 and a second simulator 1010 each with an operator position (1038, 1058), respectively. Operators may handoff from vehicle control from one simulator to the other in a seamless manner allowing operators to take breaks and/or rotate in shifts. In at least some embodiments a movable control vehicle includes two or more simulator systems with handoff capability.

While aerial vehicles are one common form of unmanned vehicle, land based unmanned vehicles are also useful in a wide variety of applications from civilian construction and industrial applications to military applications where the land vehicle may be used to transport supplies and/or as a weapons platform in a hostile environment. Other exemplary unmanned vehicles include land vehicles designed to go into environments which are potentially hazardous to humans, e.g., a vehicle designed to enter a radioactive zone, a vehicle designed to entire a fire, a vehicle designed to entire a mine, a vehicle designed to traverse a minefield, a vehicle designed to retrieve a suspected bomb. Still other exemplary unmanned vehicle includes miniature vehicles which can go places where a human could not fit.

The simulator control system of the present invention, by supporting a wide range of motion, allows the same simulator based control system to control a wide variety of vehicles while providing realistic motion simulator corresponding to very different types of vehicles being controlled.

In some embodiments, a single mobile control vehicle with one or more simulator based control systems supports a variety of different types of vehicles. For example a land vehicle such as an unmanned artillery piece or gun system may be operated by one operator controlling the land vehicle from a first simulator while a second simulator may be used to control an unmanned aerial vehicle. The first simulator may switch from controlling the land vehicle to controlling the aerial vehicle as needed in a seamless transition.

It should be appreciated that the simulator based unmanned vehicle control systems of the present invention can be used to provide a flexible and cost effective approach to controlling a large variety of unmanned vehicles from a single mobile control vehicle.

Given that the operator of the vehicle senses the actual vehicle motion as if the operator were in the vehicle, the operator is quickly made aware of jerky or sudden changes in vehicle direction due to operator manipulation of the controls. In addition, based on feedback from the vehicle the operator can be provided with a realistic sense of the air turbulence or road conditions being encountered by the vehicle. The slope of incline or decent is also conveyed to the vehicle operator through actual changes in angle of the operator position in the simulator and not merely via a screen display. Accordingly, the operator is quickly made aware of dangerous angles of inclined or ascent based on the operators own physical position as the simulator simulates the vehicle motion. Such tactical communication of the vehicles motion to the operator is likely to decrease the number of accidents due to an operator's failure to appreciate the position and/or motion of the vehicle being controlled.

The simulator of the invention in addition to including a moveable operator position (1038, . . . , 1058) includes an operator control interface, e.g., associated vehicle controls (1040, . . . , 1060), a visual system interface, e.g., a display screen (1042, . . . , 1062) and corresponding audio system interface (1044, . . . , 1064), respectively. The moveable operator position (1038, . . . , 1058) is moved by actuators (1046, . . . , 1066), under control of the vehicle simulation control module (1048, . . . , 1068), respectively.

For example, operation position 1 1038 is moved by movement actuators 1046 under control of vehicle simulator control module 1 1048. Exemplary vehicle simulator 1008 includes operator control interface 1 1040 including associated vehicle controls such as, e.g., activations switches, steering controls, sensor controls, engine controls, weapons system controls, countermeasure controls, etc. Exemplary vehicle simulator 1008 further includes visual system interface 1 1042 including, e.g., one or more display screens, and audio system interface 1 1044 including audio generation devices to generate audio sounds similar to what is experienced in the vehicle environment, e.g., engine noises, weapons deployment noise, landing gear noise, various alarms, etc. Thus an operator is submerged in a highly realistic simulation making the operator feel as if he/she was present in and operating the vehicle under control.

The simulator based control system of the present invention is well based for control of vehicles with long operating durations, e.g., diesel drone aircraft or unmanned land or marine vehicles which may be deployed for days or even weeks without refueling. In some embodiments, the controlled aerial vehicle is a diesel powered unmanned aerial vehicle and the operator position being controlled simulates the motion a human operator would feel if the human operator was positioned with the unmanned aerial vehicle.

Transmitter module 1014 transmits signals, e.g., control signals, via transmit antenna 1018 used to control the unmanned vehicle. In some embodiments, for some types of vehicles the signals are transmitted directly to the unmanned vehicle. In some embodiments, for some types of vehicles the signals are transmitted indirectly to the unmanned vehicle, e.g., via a relay station or relay node or satellite link. The transmitted control signals may be unencrypted or encrypted depending upon the particular application.

Receiver module 1012 receives signals communicating information originally sources from the unmanned vehicle, e.g., telemetry data from the unmanned vehicle. Various information communicated include, e.g., camera feeds, radar feeds, vehicle position information, vehicle orientation information, flight control information, angular changes over time, changes in velocity over time, vehicle status information, sensor information, and weapons system information, wind sensor information, temperature sensor information, etc. Vehicle status information includes, e.g. built-in test equipment fault detection information, engine performance information, fuel information, etc. In some embodiments, for some types of vehicles the signals are received directly from the unmanned vehicle. In some embodiments, for some types of vehicles the signals are received indirectly from the unmanned vehicle, e.g., via a relay station or relay node or satellite link. The received telemetry signals may be unencrypted or encrypted or a combination of thereof depending upon the particular application.

Figure 2:
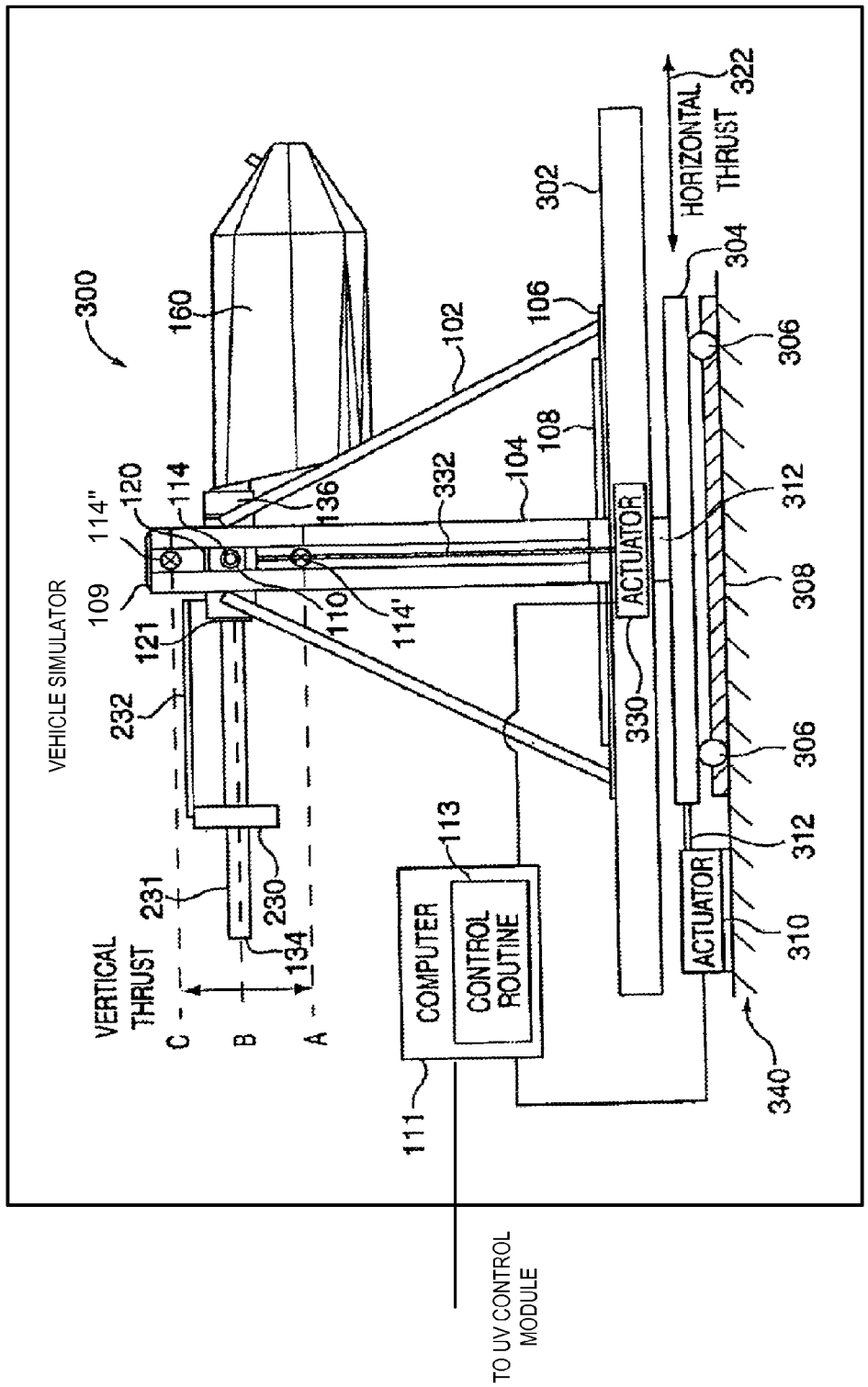
FIG. 2 illustrates a vehicle simulator implemented in accordance with an embodiment of the present invention which can be used in the vehicle control system of FIG. 1 and which supports sudden changes in elevation and rapid movements along a horizontal axes in addition to motion along pitch, roll and yaw axes.
Figure 3:
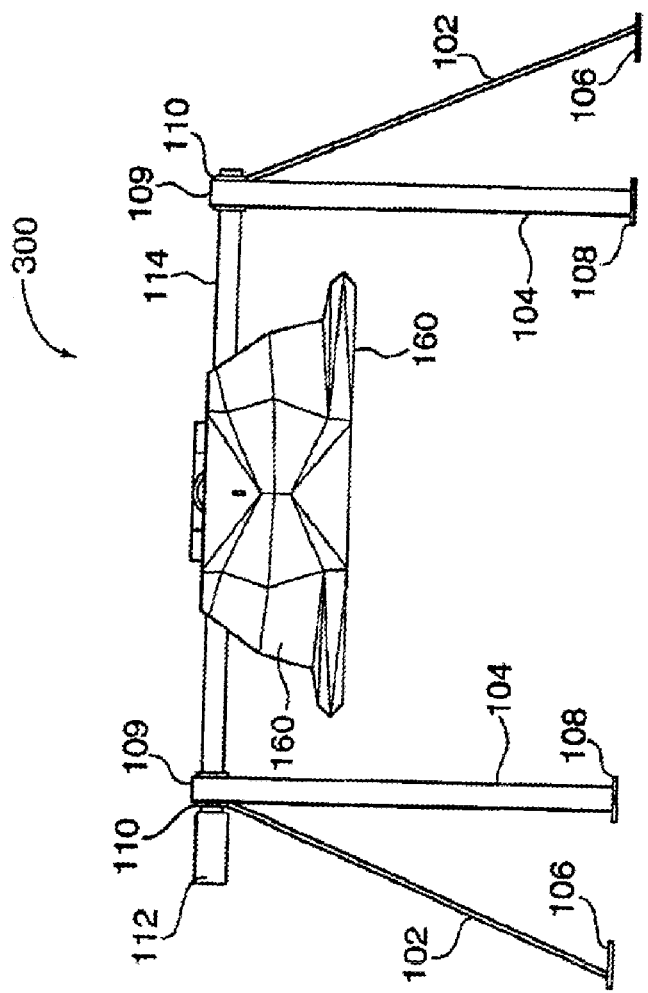
FIG. 3 is a frontal view of a portion of the vehicle simulator shown in FIG. 2.

FIG. 2 illustrates a vehicle simulator system 300 implemented in accordance with one embodiment of the present invention including a passenger compartment 160 shown in an inverted position. FIG. 3 illustrates the upper portion of the flight simulator of FIG. 2 as viewed from the front and with the top of the passenger compartment 160 removed and with the compartment 160 in the non-inverted seating position. The same reference numbers are used in FIGS. 2 and 3 to refer to the same elements.

As illustrated, the system 300 includes a support assembly comprised of support frames 102 and side frames 104, which rest upon plates 106, 108, respectively. The side frames 104 terminate at and support pedestals 109. The pedestals 109 and their associated supports are spaced apart, and in turn support, two pitch bearings 110 which provide a rotating support to pitch boom 114 which lies along a pitch axis. One of the pedestals 109 also supports a pitch motor 112 (see FIG. 3), which is adapted to drive the pitch boom 114 around the pitch axis. The pitch motor 112 may be driven electrically or hydraulically under computer control, e.g., under control of computer 111 and control routine 113. Pitch boom 114 supports hub 120 which supports swing boom 134 such that the swing boom 134 lies along a roll axis that is perpendicular to the pitch boom and pitch axis. The hub 120 rotates with the pitch boom and includes a roll motor 121 and roll bearings which permit the swing boom 134 to be rotated about the roll axis by the roll motor 121.

One end 136 of the swing boom 134 supports a passenger compartment, e.g., cockpit assembly 160. A counterweight 230 is slidably connected to move along a second section of swing boom 134. The counterweight 230 serves as a counter balance to passenger compartment 160 and can be slid to provide for adjustments intended to compensate for variations in the weight of the passenger compartment 160 due to the presence of different weight occupants at different times. Counterweight drive assembly 232 is interspersed between the counterweight and the pitch boom 114 to provide a mechanism for adjusting the position of counterweight 230.

In the FIG. 2 illustration the cockpit assembly is shown in an inverted position subjecting occupants included therein to negative G forces. The cockpit assembly may comprise: a seat for a trainee, e.g., an operator position such as operation position 1038, input controls such as a joystick, a wheel, buttons, instruments, weapons controls, and visual displays, etc. The input controls are, e.g., included as part of an operator control interface, visual system interface and audio system interface, such as operator control interface 1040, visual system interface 1042 and audio system interface 1044. The cockpit may also include a lid or cover so that it can be closed for flight simulation purposes. The pitch boom can be raised and lowered by vertical activator 330 which drives linkage 332 to raise and/or lower the pitch boom 114.

Plates 106, 108 rest on platform 302 which in turn is supported by yaw motor 312 and base 304. Yaw motor 312 drives platform 302, under computer control, around the yaw axis. Platform 302 includes vertical actuator 330 used to drive linkage 332 which supports pitch boom 114 and, in turn, hub 120, boom 134 and passenger compartment 160. Vertical actuator 330 is securely mounted in platform 302 so that is remains fixed as it drives linkage 332 to raise and lower pitch boom 114 and thus cockpit 160. Vertical actuator 330 may be implemented using an electric motor, hydraulic motor and/or some other known motion inducing device. Drive linkage 332 may be, e.g., a screw drive in the case of an electric motor actuator or a piston rod in the case of a hydraulic motor actuator, or a cable drive system including one or more cables and pulleys.

The pitch boom 114 may be raised and lowered by vertical actuator 330. For example, it can be lowered to allow easy passenger entry into the cockpit assembly 160 and then raised to initial starting position B at which point the simulation may begin. Position C indicates the maximum height to which pitch boom 114 may be raised during simulator operation while position A represents the normal low point of pitch boom 114 during a simulation. Position A is sufficiently high above platform 302 to permit full rotation of the passenger compartment around the pitch axis during a simulation. Reference 114' shows the position of the pitch boom when at lower level A while 114" shows the position of the pitch boom when at upper level C.

Under computer control, in which computer 111 uses, e.g., executes control routine 113, vertical actuator will suddenly raise and lower the swing boom 114, e.g., to simulate rapid changes in aircraft elevation due to turbulence or other conditions, during a flight simulation. Computer 111 and control routine 113, in one embodiment, are represented by a vehicle simulator control module, e.g., module 1048. Vertical acceleration is achieved by actuator 330. In one such embodiment, the distance between elevations A and C is 15 feet. For various applications, e.g., different devices being simulated, different acceleration rates may be supported. The distance and vertical acceleration rate discussed are exemplary and may vary depending on the implementation.

The ability to support sudden horizontal thrusting motion is achieved as illustrated in FIG. 2, by mounting the base 304 in a fashion that allows the flight simulator passenger compartment 160 and related supporting structures to be moved by a horizontal actuator 310 in a horizontal direction during operation. Accordingly, in the FIG. 2 embodiment, the passenger compartment and any occupants included therein can be subject to sudden motion in a horizontal direction while, at the same time the passenger compartment 160 is subjected to motion along a pitch, a roll and/or a yaw axes and, optionally, subject to sudden vertical acceleration.

In FIG. 2, the base 304 is mounted on wheels 306 which allow the simulator 300 to roll along rails 308 in response to horizontal actuator 310 extending and/or retracting linkage 312. Rails 308 serve as a guide to restrict motion in the horizontal thrust direction in response to movement of linkage 312. Linkage 312 connects the actuator 310 to base 304. The wheel and rail mounting arrangement is merely exemplary of one arrangement for slidably mounting the passenger compartment support assembly including base 302, plate 106 and supports 102 in a manner that allows horizontal motion. Base 304 may be mounted in a manner that allows the base 304 to slide along rails 308 without the benefit of the rolling action provided by wheels 306. Guides other than rails 308 may be used to restrict horizontal motion.

Horizontal actuator 310 is secured to the trailer floor upon which the rails 308 rest. Actuator 310 may be implemented as an electric motor, hydraulic motor or a variety of other motion inducing devices. Horizontal actuator 310 is of sufficient size to produce sudden movements, as represented by arrow 322, of the flight simulator's passenger compartment support assembly and passenger compartment 160 during operation. In one embodiment, horizontal thrust at rates of up to 30 feet per second are supported. However, other thrust rates are possible. In some embodiments, horizontal travel distances of several feet are supported by the rails 308 permitting a fair amount of sudden horizontal motion. Various horizontal travel distances may be supported depending on the implementation.

Figure 4:
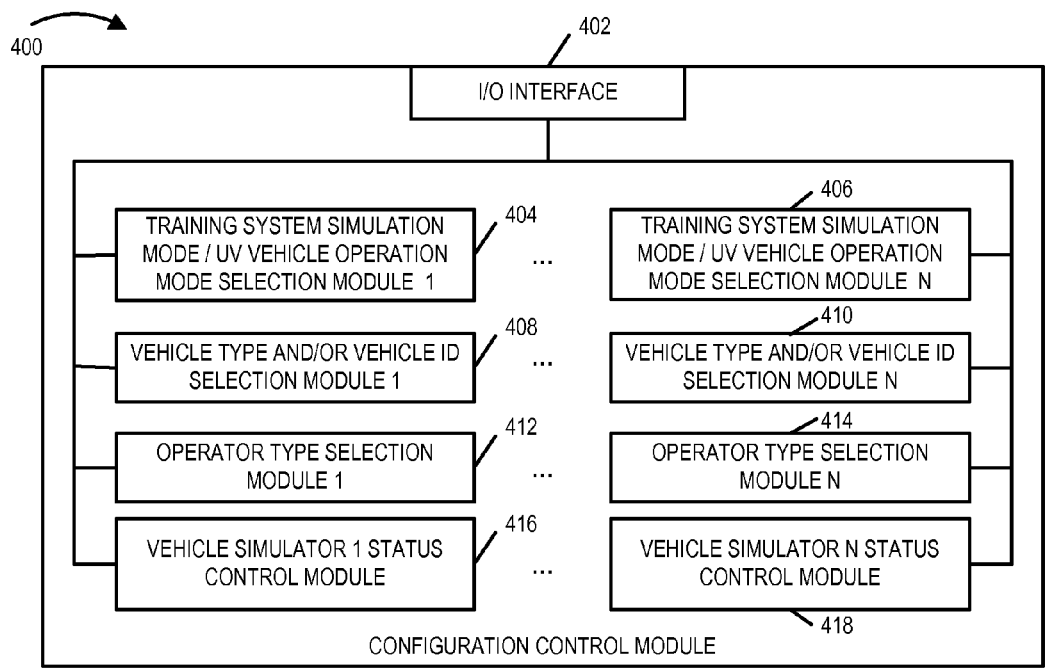
FIG. 4 illustrates an exemplary configuration control module which may be the configuration control module of the exemplary mobile unmanned vehicle control system of FIG. 1.

FIG. 4 illustrates an exemplary configuration control module 400 in accordance with an exemplary embodiment. Exemplary configuration control module 400 includes an I/O interface 402 for receiving input from a system control manager, displaying output to a system control manager, and for interfacing with other devices in the system 100. Configuration control module 400 includes a plurality of training system simulation mode/UV vehicle operation mode selection modules (404, ..., 406) corresponding to each of the unmanned vehicle simulators which are in system 100. Training system simulation mode/UV vehicle operation mode selection module 1 404 is used to configure vehicle simulator 1 1008 to operate as either a training system simulator or an unmanned vehicle controller at a given time. Training system simulation mode/UV vehicle operation mode selection module N 406 is used to configure vehicle simulator N 1010 to operate as either a training system simulator or an unmanned vehicle controller at a given time.

Configuration control module 400 also includes a plurality of vehicle type and/or vehicle ID selection modules (408, . . . , 410) corresponding to each of the unmanned vehicle simulators which are in system 100. Vehicle type and/or vehicle ID selection module 1 408 is used to configure vehicle simulator 1 1008 to operate to simulate a particular type of unmanned vehicle and/or a particular individual vehicle designated by an ID number. For example, there may be a wide range of different unmanned vehicles which are supported including various types of aerial vehicles, various types of land vehicles, and various types of water vehicles. Exemplary unmanned aerial vehicles include, e.g., weaponized UAVs, surveillance UAVs, communications supporting UAVs, fixed wing powered UAVs, helicopter UAVs, gliders, blimps, airships, powered guided munitions, and unpowered guided munitions. Exemplary unmanned land vehicles include, e.g., surveillance vehicles, weaponized vehicles, and hazardous environment vehicles. Exemplary unmanned water vehicles include both surface vehicles and submersible vehicles. Vehicle type and/or vehicle ID selection module N 410 is used to configure vehicle simulator N 1010 to operate to simulate a particular type of unmanned vehicle and/or a particular individual vehicle designated by an ID number.

Configuration control module 400 also includes a plurality of operator type selection modules (412, . . . , 414) corresponding to each of the unmanned vehicle simulators which are in system 100. Operator type selection modules 1 412 is used to configure vehicle simulator 1 1008 to operate to provide simulation for a particular type of unmanned vehicle operator corresponding to a selected unmanned vehicle. For example, an aerial vehicle may have two operators, e.g., a first operator which is a pilot and a second operator which is a weapons/countermeasures officer. As another example, a unmanned tank may have a first operator which is a driver and a second operator which is a gunner. Operator type selection modules N 414 is used to configure vehicle simulator N 1010 to operate to provide simulation for a particular type of unmanned vehicle operator corresponding to a selected unmanned vehicle.

Configuration control module 400 also includes a plurality of vehicle simulator status control modules (416, . . . , 418) corresponding to each of the unmanned vehicle simulators which are in system 100. Vehicle simulator status control module 1 416 is used to set status for vehicle simulator 1 1008. In one example, exemplary status alternatives include: off, on active, and on standby. In some embodiments, during a portion of a mission communications with the unmanned vehicle are intentionally severed, e.g., for security purpose, power purposes, and/or due to physical topology preventing a communications link with the available antennas. In some such embodiments, during such times, the unmanned vehicle is operated autonomously, e.g., using a preprogrammed flight path, with the vehicle simulator being placed in an on-standby mode during that time interval. In some embodiments, the vehicle simulator is switched back to an on-status mode in response to a resumption of the communications link with unmanned vehicle, e.g., at the end of a scheduled blackout window or in response to a detected fault on the unmanned vehicle. Vehicle simulator status control module N 418 is used to set status for vehicle simulator N 1010.

Figure 5:
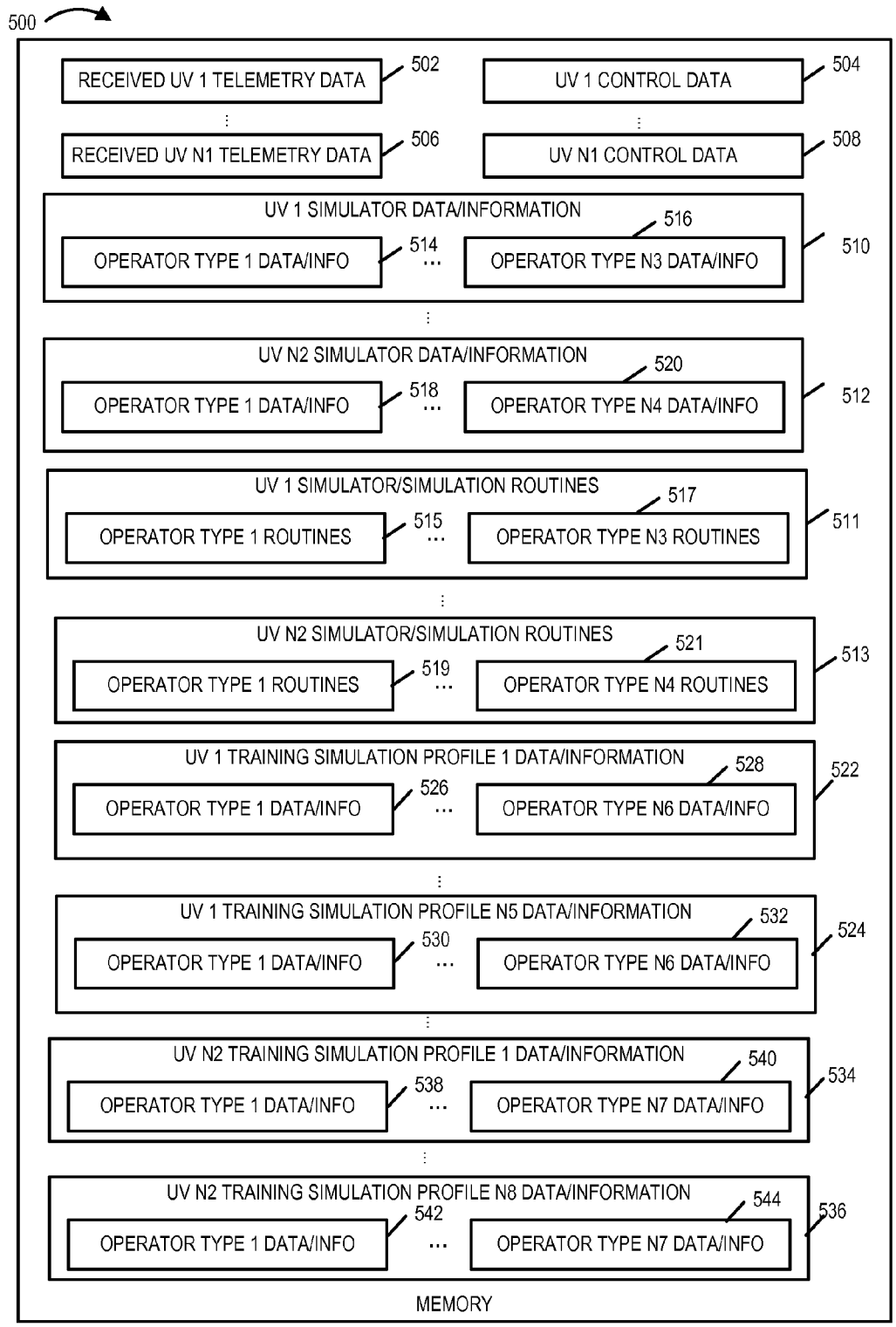
FIG. 5 illustrates an exemplary memory which may be the memory of mobile unmanned vehicle control system of FIG. 1.

FIG. 5 illustrates an exemplary memory 500 which may be the memory 1028 of mobile unmanned vehicle control system 100 of FIG. 1. Memory 500 includes a plurality of sets of telemetry data received from unmanned vehicles which are being controlled (received UV 1 telemetry data 502, . . . , received UV N1 telemetry data 506) and a plurality of sets of control data, e.g., for transmission, corresponding to the plurality of unmanned vehicles which are being controlled (UV 1 control data 504, . . . , UV N1 control data 508), where N1 is the number of vehicles being controlled by the system.

Memory 500 also includes a plurality of sets of unmanned vehicle simulator data/information corresponding to the various different types of vehicles supported by the vehicle simulators (UV 1 simulator data/information 510, . . . , UV N2 simulator data/information 512), where N2 is the number of different unmanned vehicle types supported by the system. Corresponding to each particular vehicle type there are one or more different operators for the unmanned vehicle, and a vehicle simulator may be configured differently depending upon the particular operator, e.g., pilot, co-pilot, weapons officer, etc. UV 1 simulator data/information 510 includes a plurality of sets of operator type data/information (operator type 1 data/information 514, . . . , operator type N3 data/information 516, where there are N3 different types of alternative operators corresponding to the unmanned vehicle of information set 510. UV N2 simulator data/information 512 includes a plurality of sets of operator type data/information (operator type 1 data/information 518, . . . , operator type N4 data/information 520, where there are N4 different types of alternative operators corresponding to the unmanned vehicle of information set 512. For some unmanned vehicles there is one operator and one set of operator type data/information.

As part of a configuration of a vehicle simulator, e.g., initial configuration or prior to a handoff, an appropriate set of operator type data/information corresponding to the vehicle and operator type is loaded from memory, e.g., 1028, into stored simulator information, e.g., 1052, of the simulator's vehicle simulator control module, e.g., 1048, under the direction of the configuration control module 1024.

Unmanned simulator data/information, e.g., data 510 and data 512, in some embodiments, includes information used to simulate unmanned vehicle motion, e.g., vibration, in response to external conditions the vehicle is experiencing. For example, information is included to generate a vibration profile to subject the operator to, corresponding to measured or estimated wind forces that the unmanned vehicle is being subjected for a particular vehicle type, operator type, airspeed, temperature, and altitude. Different unmanned vehicles may have different responses to the same set of external conditions, and the difference may be modeled so the operator experiences a realistic feel of the unmanned vehicle environment.

Memory 500 also includes a plurality of sets of unmanned vehicle simulator/simulation routines corresponding to the various different types of vehicles supported by the vehicle simulators (UV 1 simulator/simulation routines 511, . . . , UV N2 simulator/simulation routines 513), where N2 is the number of different unmanned vehicles types supported by the system. Corresponding to each particular vehicle type there are one or more different operators for the unmanned vehicle, and a vehicle simulator may be operated differently depending upon the particular operator, e.g., pilot, co-pilot, weapons officer, etc. UV 1 simulator/simulation routines 511 includes a plurality of sets of operator type routines (operator type 1 routines 515, . . . , operator type N3 routines 517, where there are N3 different types of alternative operators corresponding to the unmanned vehicle of routine set 511. UV N2 simulator/ simulation routines 513 includes a plurality of sets of operator type routines (operator type 1 routines 519, ..., operator type N4 routines 521, where there are N4 different types of alternative operators corresponding to the unmanned vehicle of routine set 513. For some unmanned vehicles there is one operator and one set of operator type routines.

In some embodiments, as part of a configuration of a vehicle simulator, e.g., initial configuration or prior to a hand-off, an appropriate set of operator type routines corresponding to the vehicle and operator type is loaded from memory, e.g., 1028, into the simulator's vehicle simulator control module, e.g., 1048, under the direction of the configuration control module 1024. For example, a particular set of routines corresponding to a selected vehicle type and operator type is loaded into a processor of a vehicle control simulator module to be subsequently executed. In some embodiments, the various possible alternative routines are already resident within the vehicle simulator control module, and communicating configuration data and/or received simulation data/information to vehicle simulation control module is sufficient for the vehicle simulator to simulate the desired vehicle environment for the operator.

Memory 500 also includes sets of training simulation profile information corresponding to the various combinations of different unmanned vehicles, different operator types, and different simulations. Some of the different simulations introduce various expected terrains, environmental conditions, errors, failures, threats, and/or targets expected to be encountered by an actual unmanned vehicle. Memory 500 includes a plurality of sets of information corresponding to a first vehicle type (UV 1 training simulation profile 1 data/information 522, ..., UV 1 training simulation profile N5 data/information 524), where there are N5 alternative profiles. UV 1 training simulation profile data/information 1 522 includes a plurality of set of information corresponding to different operator types supported (operator type 1 data/information 526, ..., operator type N6 data information 528). UV 1 training simulation profile data/information N5 524 includes a plurality of set of information corresponding to different operator types supported (operator type 1 data/information 530, ..., operator type N6 data information 532).

Memory 500 includes a plurality of sets of information corresponding to another vehicle type (UV N2 training simulation profile 1 data/information 534, ..., UV N2 training simulation profile N8 data/information 536), where there are N8 alternative profiles. UV N2 training simulation profile 1 data/information 534 includes a plurality of set of information corresponding to different operator types supported (operator type 1 data/information 538, ..., operator type N7 data information 540). UV N2 training simulation profile N8 data/information 536 includes a plurality of set of information corresponding to different operator types supported (operator type 1 data/information 542, ..., operator type N7 data information 544).

Training simulation profile data/information is used for the training system control module 1022 to simulate an unmanned vehicle and/or simulate the UV control module 1020. The inclusion of training system control module and a training database, e.g., training system profile information (522, 524, 535, 536) of FIG. 5 in memory 1028, which simulates an unmanned vehicle in a virtual environment allows system 100 to be used to train operators, e.g., train new operators and train existing operators, e.g., whenever the system is available for training purposes. When an operator achieves a prescribed level of proficiency using the training mode of operation, the system can be connected directly with the real unmanned vehicle for operation.

Figure 6:
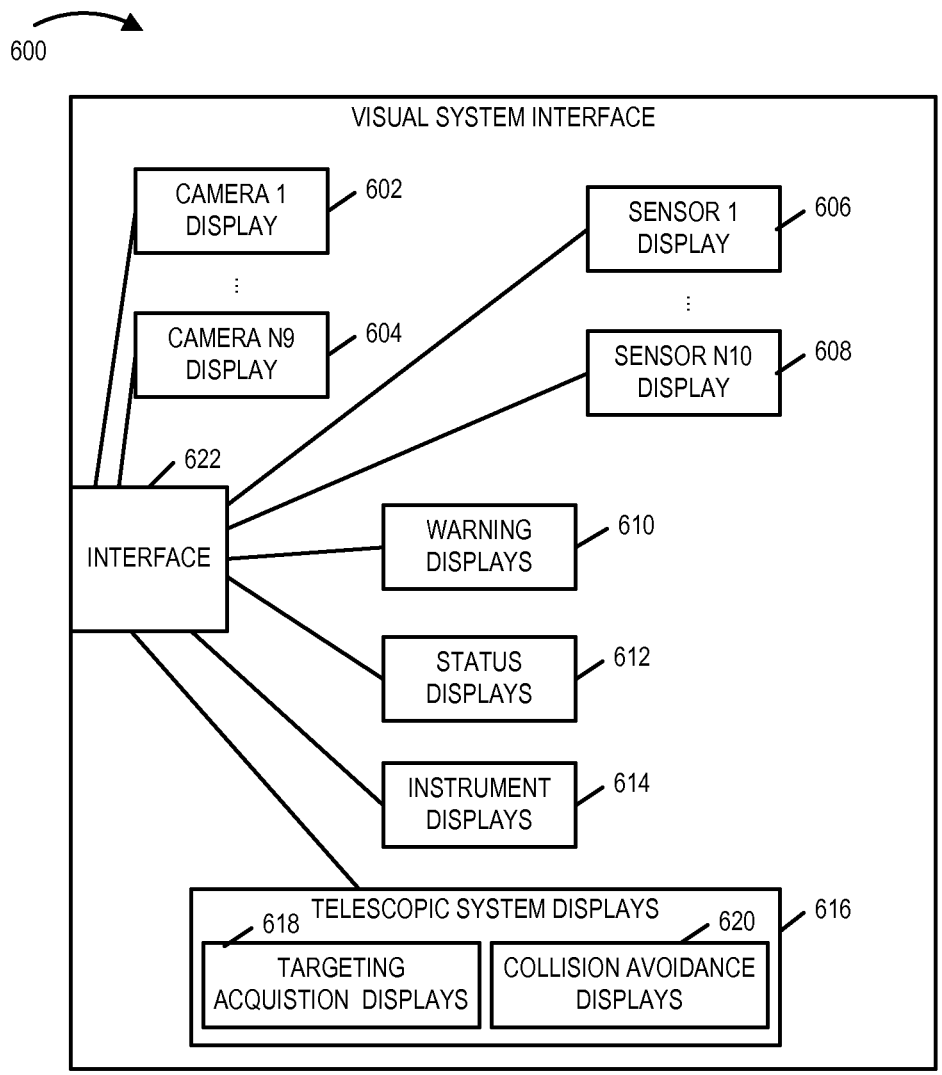
FIG. 6 illustrates an exemplary visual system interface which may be one of the visual system interfaces of a vehicle simulator in the exemplary mobile unmanned vehicle control system of FIG. 1.

FIG. 6 illustrates an exemplary visual system interface 600 which may be one of the visual system interfaces of a vehicle simulator in the exemplary mobile unmanned vehicle control system of FIG. 1, e.g., visual system interface 1 1042. Visual system interface 600 includes a plurality of camera displays (camera 1 display 602, ..., camera N9 display 604), a plurality of sensor displays (sensor 1 display 606, ..., sensor n10 display 608), warning displays 610, status displays 612, instrument displays 614, and telescopic system displays 616. The telescopic system displays include targeting acquisition displays 618 and collision avoidance displays 620. The various displays are coupled to an interface 622. A camera display may display video feed from a camera mounted on the unmanned vehicle. Various camera types are possible including various visible spectrum and infra-red cameras. In some embodiments, a camera display displays a composite image corresponding to a plurality of cameras. In some embodiments, camera feed data has undergone processing, e.g., enhancements, prior to being displayed. One exemplary sensor display displays information obtained from a radar unit mounted on the unmanned vehicle being controlled. In some embodiments different types of radars and/or different direction radars are supported by the unmanned vehicle with different displays correspond to the different radars being used by the unmanned vehicle.

In various embodiments, the visual system interface allows for much higher pilot situational awareness with 360 cameras and telescopic systems for longer range target acquisition and/or air to air collision avoidance. Currently most aircraft have 200 degrees horizontal and 60 degrees vertical or less so with this type of integration the pilot would not only have physical g orientation but enhanced visual abilities.

Figure 7A:
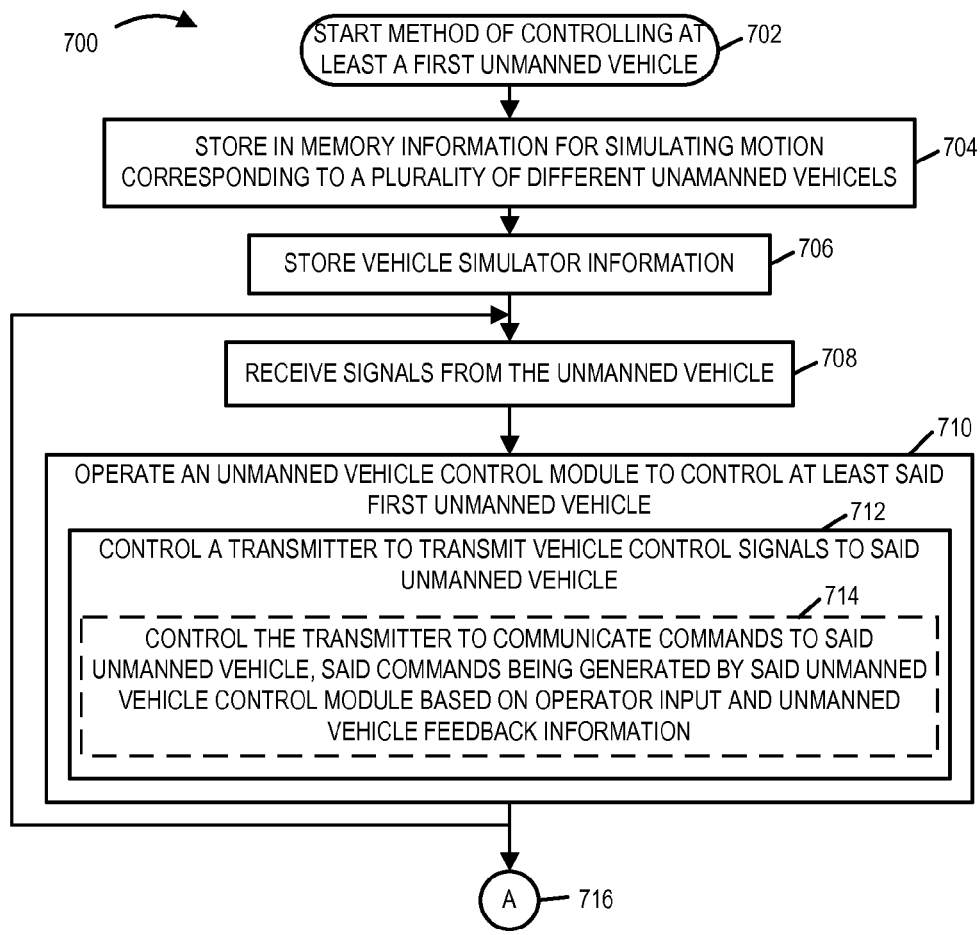
FIG. 7, comprising the combination of FIG. 7A, FIG. 7B
FIG. 7C is a flowchart of an exemplary method of operating a vehicle simulator in accordance with various exemplary embodiments.
Figure 7B:
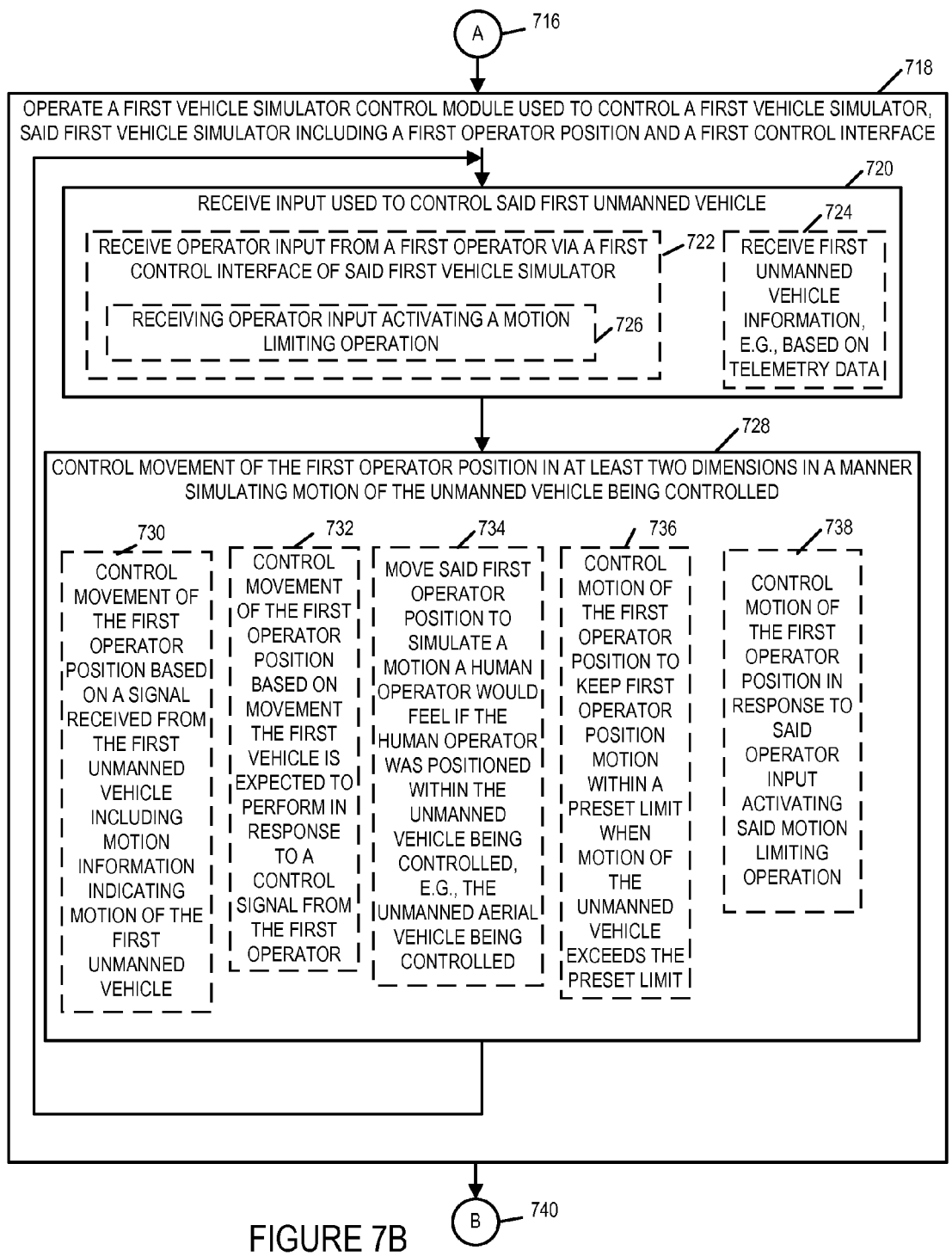
Figure 7C:
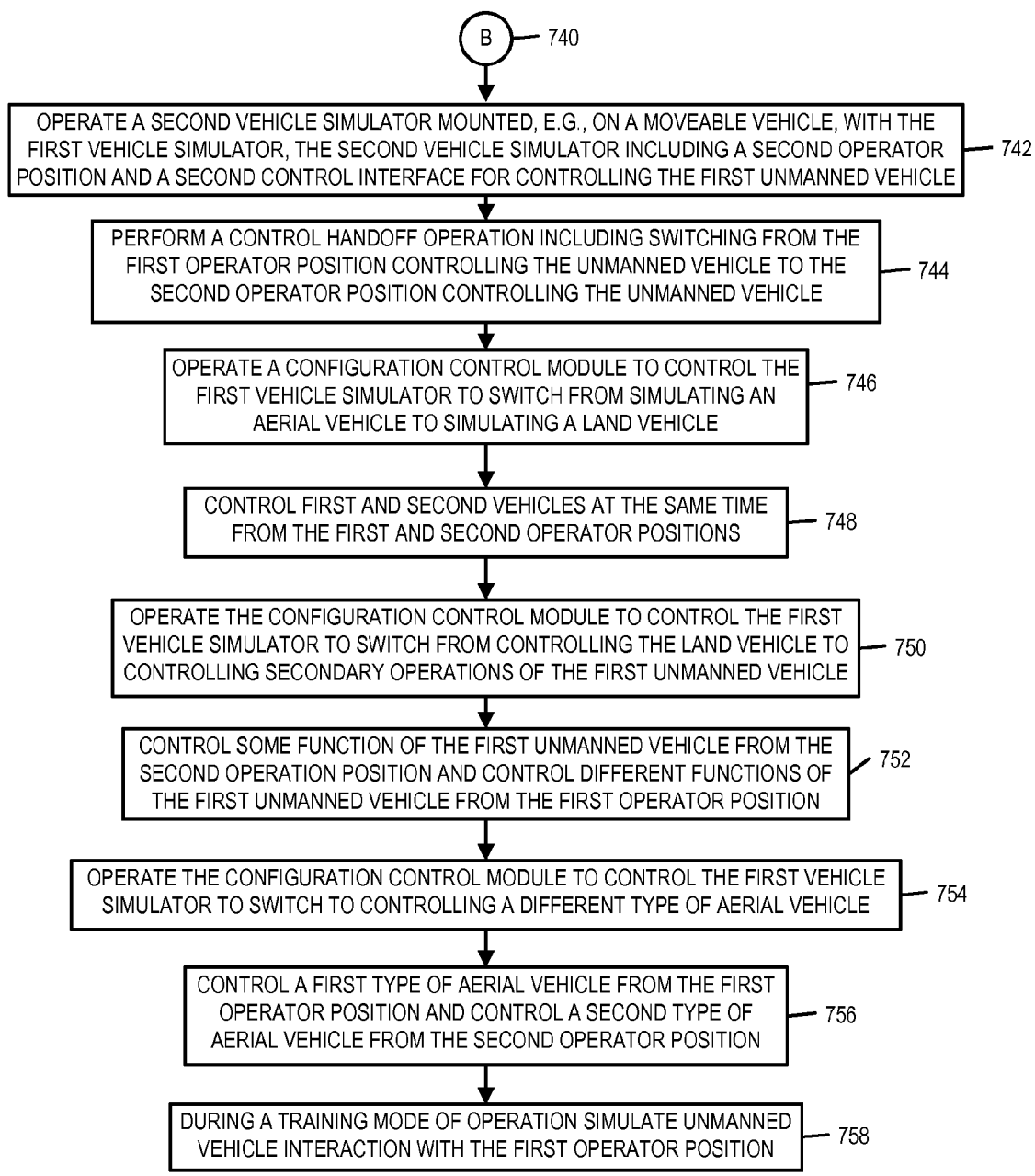

FIG. 7, comprising the combination of FIG. 7A, FIG. 7B and FIG. 7C, is a flowchart 700 of an exemplary method of controlling at least a first unmanned vehicle in accordance with an exemplary embodiment. The exemplary method of flowchart 700 is implemented, e.g., by a vehicle control system such as the unmanned vehicle control system illustrated in FIG. 1. Operation of the exemplary method starts in step 702, where the vehicle control system is powered on and initialized. Operation proceeds from start step 702 to step 704, in which information for simulating motion corresponding to a plurality of different unmanned vehicles is stored in memory. For example, sets of information (510, ..., 512, 514, ..., 516, 526, ..., 528) of FIG. 5 are loaded in memory 1028 by configuration control module 1024. In some embodiments, one of the plurality of different unmanned vehicles is an unmanned aerial vehicle and another one of said plurality of different unmanned vehicles is a land vehicle. In some embodiments, one of the plurality of different unmanned vehicles is an unmanned aerial vehicle, another one of said plurality of different unmanned vehicles is a land vehicle, and another one of said plurality of unmanned vehicles is a water vehicle.

Operation proceeds from step 704 to step 706, in which vehicle simulator information is stored. For example, configuration control module 1024 loads a set of information from memory 1028 into stored simulation information 1052 of vehicle simulator control module 1 1048 corresponding to the unmanned vehicle intended to be controlled by the operator of vehicle simulator 1 1008.

Operation proceeds from step 706 to step 708 in which signals are received from the unmanned vehicle. For example, receiver module 1012 receives signals from the unmanned vehicle being controlled via receive antenna 1016. The received signals are communicated to UV control module 1020. UV control module stores received signals in memory, e.g., as received UV 1 telemetry data 502. Some of the received data may be, and sometimes is, processed by the UV control module 1020. Some of the received data in raw and/or processed form is communicated to the vehicle simulator control module controlling the unmanned vehicle, e.g., module 1048 for vehicle simulator 1 1008.

Operation proceeds from step 708 to step 710, in which the unmanned vehicle control module is operated to control at least the first unmanned vehicle. For example, UV control module 1020 is operated to control the first unmanned vehicle. Step 710 includes step 712 in which a transmitter is controlled to transmit vehicle control signals to at least said first unmanned vehicle. For example, UV control module 1020 controls transmitter module 1014 to transmit signals to the first unmanned vehicle via transmit antenna 1018.

Step 712 may, and sometimes does, includes step 714, in which the transmitter is controlled to communicate commands to said unmanned vehicle, said commands being generated by said unmanned vehicle control module based on operator input and unmanned vehicle feedback information. For example, in step 714 UV control module 1020 controls transmitter 1014 to transmit UV 1 control data 504 to said first unmanned vehicle. UV 1 control data 504 is, e.g., generated by UV control module 1020, e.g., in the appropriate format for first unmanned vehicle. UV 1 control data 504 is, e.g., generated based on an operator input via operator control interface 1 1040 and based on vehicle feedback information received in received UV 1 telemetry data 502. Steps 708 and 710 may be performed on an ongoing basis while the first unmanned vehicle is being controlled. In some embodiments, reception of signals from an unmanned vehicle and transmission of signals to the unmanned vehicle occur concurrently. The UV control module 1020 is capable of controlling multiple unmanned vehicles simultaneous. Thus, during at least some times, e.g., when multiple unmanned vehicles are being controlled by UV control module 1020, signals are received from multiple unmanned vehicles, and control signals are transmitted to multiple unmanned vehicles. Operation proceeds from step 710 via connecting node A 716 to step 718.

In step 718 a first vehicle simulator control module is operated to control a first vehicle simulator. The first vehicle simulator includes a first operator position and a first control interface. For example, vehicle simulator control module 1 1048 is operated to control vehicle simulator 1 1008 which includes operator position 1 1038 and operator control interface 1 1040. Step 718 includes step 720 and step 728.

In step 720, the received input is used to control the first unmanned vehicle. Step 720 may, and sometimes does, include step 722 in which operator input is received from a first operator via a first control interface of said first vehicle simulator. For example, an operator seated in operator position 1 1038, moves a switch, presses a button, presses a touch-screen, moves a lever, e.g., a control joystick, moves a steering wheel and/or depresses a pedal, which is part of operator control interface 1 1040, and information corresponding to the operator input is sensed by the vehicle simulator control module 1048. Step 722 may, and sometimes does include step 726 in which operator input is received operator input activating a motion limiting operation. For example, the operator in operation position 1 1038 may have decided that the motion is causing disorientation or that during a particular phase of a mission, some or all of the motion is disadvantageous and may decide to manually disable motion or limit motion. For example, when targeting and/or deploying weapons it may be advantageous to stop vibrations. As another example, the operator may decide that the unmanned vehicle should be destroyed because of damage or a malfunction, and the vehicle is going to be put into a death spiral. In such a situation the operator may decide to manually enter input to activate motion limiting.

Step 720 may, and sometimes does, include step 724 in which first unmanned vehicle information, e.g., information based on telemetry data, is received. For example, the vehicle simulator control module 1 1048, receives some of the raw telemetry data from the first unmanned vehicle which is being controlled or a filtered version of some of the telemetry data. Exemplary data includes, e.g., one or more of all of: GPS data, gridmap position data, altitude data, roll data, pitch data, yaw data, azimuth data, true heading data, magnetic heading data, angular rate data, velocity data, velocity change data, angular rate change data, acceleration data, wind force measurements, turbulence measurements, and time tag information.

Operation proceeds from step 720 to step 728. In step 728 movement of the first operator position in at least two dimensions is controlled in a manner simulating motion of the unmanned vehicle being controlled. For example, vehicle simulator control module 1 1048 controls motion of the operator position 1 1038 in at least two dimensions. For some unmanned vehicles, e.g., some aerial vehicles, the control is in three dimensions. In some embodiments, step 728 includes one or more of all of steps 730, 732, 734, 736 and step 738. During at least some iterations of step 728 more than one of steps 730, 732, 734, 736 and step 738, are performed jointly.

In step 730 movement of the first operator position is controlled based on a signal received from the first unmanned vehicle including motion information indicating motion of the first unmanned vehicle. For example, vehicle simulator control module 1 1048 moves the operator position 1 1038 based on a signal received in telemetry data 502, e.g., a change in pitch angle.

In step 732 movement of the first operator position is controlled based on movement the first vehicle is expected to perform in response to a control signal from the first operator. For example, vehicle simulator control module 1 1048 moves the operator position 1 1038 based on a detected motion of a joystick serving as pilot control stick. Movement of the vehicle simulator based on expected unmanned vehicle motion is useful in environments where the round trip signaling time to the unmanned vehicle being controlled is relatively long and would otherwise result in lags in response if vehicle simulator motion was solely based on feedback information from the unmanned vehicle. In some embodiments, during some phases of a mission, the amount of telemetry data available for controlling the simulator may be limited, e.g., due to security reasons or power concerns. In some embodiments, movement of the first operator position is based on a combination of signals received from the unmanned vehicle and control signals from the first operator. In some embodiments, the weighting for control of movement of the first operation position changes over time. For example, in some embodiments, during landing and takeoff weighting is more heavily based on the feedback signals from the unmanned vehicle, while during other portions of the flight weighting is more heaving based on control signals from the operator.

In some embodiments, control of movement of the first operation position is expected to make occurs before a signal received from the unmanned vehicle indicates that the expected movement occurred. In some embodiments, the vehicle simulator control module controls movement of the first operator position based on both movement of the first unmanned vehicle detected by the unmanned vehicle and the control signal from the first operator in the first operator position.

In step 734 the first operator position is moved to simulate a motion a human operator would feel if the human operator was positioned with the unmanned vehicle, e.g., unmanned aerial vehicle, being controlled. For example, step 734 is performed by vehicle simulation control module 1048 to simulate motion a human operator would be expected to feel inside the first unmanned vehicle and subject the operator in operator position 1 1038 to that motion.

In step 736 the motion of the first operator position is controlled to keep the first operation position motion within a preset limit when the motion of the unmanned vehicle exceeds the preset limit. In some embodiments, the preset limit is a pilot disorientation prevention motion limit. In some embodiments, the unmanned vehicle being controlled is designed to withstand motion limits and/or designed to have a performance envelope that exceeds limits that are considered safe for a human and/or would be expected to result in disorientation for a human. Motion limiter module 1056 of vehicle simulator control module 1048 performs automatic motion limiting of step 736 in accordance with the preset limits.

In step 738 motion of the first operator position is controlled in response to said operator input activating said motion limiting operation. For example, motion limiter module 1056 limits motion in response to a received operator input activating motion limiting operation of step 726. In some embodiments, different levels of motion limiting are selectable, e.g., stop all motion, return to level nominal position and stop all motion, reduce the rate of motion to a linear fraction of the actual rate of motion, cease all vibration, reduce the level of vibration to a linear fraction of the actual level of vibration, cease all shocks, reduce the level of shocks to a linear fraction of the actual level of shock. For example, it may be desirable for the operator to be aware that it the vehicle is undergoing severe vibration; however, it may be fatiguing to subject the operator to the actual level of vibration for an extended period of time.

In some embodiments, some movement of the first unmanned vehicle is due to an external condition affecting the unmanned vehicle. In some such embodiments, the external condition is a weather related condition. In some such embodiments, the external weather related condition is a wind force.

Steps 720 and 728 are performed on an ongoing basis while the first unmanned vehicle is being controlled by the operator in operator position 1 1038 of the vehicle simulator 1008.

In some embodiments, an unmanned vehicle control module, a first vehicle simulator, a transmitter, and a receiver are mounted on a mobile vehicle. In some such embodiments, the mobile vehicle includes a mobile trailer. Operation proceeds from step 718 via connecting node B 740 to step 742. In step 742 a second vehicle simulator mounted, e.g., on a moveable vehicle, with the first vehicle simulator is operated. The second vehicle simulator e.g., vehicle simulator 1010, includes a second operator position, e.g., operator position N 1058, and second control interface, e.g., operator control interface N 1060, for controlling an unmanned vehicle. Operator control interface 1060 can, and sometimes does, control the first unmanned vehicle. In some such embodiments, the mobile vehicle includes a mobile trailer.

In some embodiments, an unmanned vehicle control module, a first vehicle simulator, a second vehicle simulator, a transmitter, and a receiver are mounted in a container which can be shipped by truck, rail or ship. In some such embodiments, the container can be installed on a ship, e.g., an aircraft carrier, and the unmanned vehicle control system included within the container used to control unmanned vehicles operating off the ship. Operation proceeds from step 742 to step 744.

In step 744 a control handoff operation is performed including switching from the first operator position controlling the unmanned vehicle to the second operator position controlling the unmanned vehicle. For example, configuration control module 1024 performs a control handoff switching from operator position 1 1038 and operator control interface 1040 of vehicle simulator 1008 controlling the first unmanned vehicle to operator position 1058 and operator control interface 1060 controlling the first unmanned vehicle. Reasons for switching control include, e.g., length of a mission deemed too long to be performed by a single operator, certain operators having better capabilities for particular portions of a mission, e.g., one operator is particularly talented at executing landings and takeoff, another operator is particularly talented at air to air combat, another operator is particularly talented at ground attack, another operator is particularly talented at evasive maneuvers, and another operator is particularly talented at air-to-air refueling.

Operation proceeds from step 744 to step 746. In the step 746 a configuration control module, e.g., module 1024 is operated, to control the first vehicle simulator, e.g., vehicle simulator 1008 to switch from simulating an aerial vehicle to simulating a land vehicle. For example, configuration control module 1024 sends some configuration information 1054 to vehicle simulator control module 1048, and vehicle simulator control module 1048 retrieve simulator information corresponding to the land vehicle to be controlled from memory 1028 and stores the information in stored stimulator information 1052.

Operation proceeds from step 746 to step 748 in which first and second vehicles are controlled at the same time from the first and second operator positions. For example, the land vehicle is being controlled from operator position 1 1038 using operator control interface 1 1040 in conjunction with UV control module 1020. Continuing with the example, the aerial vehicle is being controlled from operator position N 1058 using operator control interface N 1058 in conjunction with UV control module 1020.

Operation proceeds from step 748 to step 750, in which the configuration control module, e.g., module 1024, controls the first vehicle simulator, e.g., simulator 1008, to switch from controlling the land vehicle to controlling secondary operations on the first unmanned vehicle, e.g., the aerial vehicle. Exemplary secondary operations include, e.g., controlling weapons systems, controlling countermeasures, controlling radars, controlling surveillance cameras, etc. Operation proceeds from step 750 to step 752. In step 752 some function of the first unmanned vehicle are controlled from the second operator position, e.g., basic flight of the unmanned vehicle, and different function of the first unmanned vehicle are controlled from the first operator position, e.g., weapons deployment and countermeasures.

Operation proceeds from step 752 to step 754. In step 754 the configuration control module, e.g., module 1024, is operated to control the first vehicle simulator, e.g., simulator 1008, to switch to controlling a different type of aerial vehicle, e.g., switching from an unmanned weaponized low altitude aerial vehicle to a high altitude unmanned surveillance aerial vehicle or switching from a fixed wing type unmanned vehicle to a unmanned helicopter aerial vehicle. Operation proceeds from step 754 to step 756 in which a first type of aerial vehicle is controlled from the first operator position and a second type of aerial vehicle is controlled from the second operator position.

Operation proceeds from step 756 to step 758. In step 758 during a training mode of operation, unmanned vehicle interaction with the first operator position is simulated. For example, during a training mode of operation, training system control module 1022 simulates operations of an unmanned vehicle in accordance with a selected profile. Different training profiles include, e.g., different exemplary failures, problems, threats, situation, targets, etc., that may be expected to be encountered. In some embodiments, training system control module 1022 replaces an unmanned vehicle. In some embodiments, the training system control module 1022 replaces an unmanned vehicle and functionality performed by UV control module 1020.

In some embodiments various features are implemented using modules. Such modules may be implemented using software, hardware or a combination of software and hardware. In some hardware embodiments all or some modules are implemented as circuits. In some hardware embodiments the modules are implemented as circuits in combination with other hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, including a processor configured to implement one, multiple, or all of the steps of one or more methods of the invention.

In some embodiments, the processor or processors, e.g., CPUs, of one or more devices, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, with a processor which includes a module corresponding to each of the steps of the various described methods performed by the device in which the processor is included. In some but not all embodiments a device includes a module corresponding to each of the steps or operations of the various described methods performed by the device in which the processor is included. The modules may be implemented using software and/or hardware.

While various embodiments have been described it should be appreciated in view of the above discussion that numerous additional embodiments are possible.

What is claimed is:

1. A vehicle control system comprising:
an unmanned vehicle control module for controlling at least a first unmanned vehicle;
a first vehicle simulator coupled to said control module, said first vehicle simulator including a first operator position and a first control interface for receiving operator input used to control said first unmanned vehicle, said first vehicle simulator including actuators for moving said operator position a full 360 degrees along at least two perpendicular axis in a manner simulating motion of the first unmanned vehicle being controlled;
a receiver for receiving signals from said first unmanned vehicle; and
a transmitter for transmitting vehicle control signals to said first unmanned vehicle.

2. The vehicle control system of claim 1, further comprising:
a vehicle simulator control module including stored vehicle simulator information and an input interface for receiving input from a first operator via the first control interface and for receiving information obtained from the first unmanned vehicle.

3. The vehicle control system of claim 2, wherein said vehicle simulator control module is configured to move the first operator position based on movement the first unmanned vehicle is expected to perform in response to a control input from the first operator.

4. The vehicle control system of claim 3, wherein said vehicle simulator control module is further configured to move the first operator position based on movement of the first unmanned vehicle detected by said first unmanned vehicle and communicated to said first vehicle simulator control module.

5. The vehicle control system of claim 4, wherein said unmanned vehicle control module communicates commands to said first unmanned vehicle generated based on operator input entered via said first control interface and communicates unmanned vehicle feedback information, including at least some position information, to said vehicle simulator control module.

6. The vehicle control system of claim 4, wherein said movement of the first unmanned vehicle is due to an external condition affecting said first unmanned vehicle.

7. The vehicle control system of claim 2, wherein the first vehicle simulator control module includes stored information for simulating motion corresponding to a plurality of different unmanned vehicles.

8. The vehicle control system of claim 7, wherein one of said plurality of different unmanned vehicles is a unmanned aerial vehicle and another one of said unmanned vehicles is a land vehicle.

9. The vehicle control system of claim 1, further comprising:
a mobile vehicle including said first vehicle simulator, said transmitter and said receiver.

10. The vehicle control system of claim 9, wherein said mobile vehicle further includes a second vehicle simulator including a second operator position and a second control interface for controlling a first unmanned vehicle, said second vehicle simulator including actuators for moving said second operator position in at least two dimensions in a manner simulating motion of said first unmanned vehicle being controlled.

11. A method of controlling at least a first unmanned vehicle, the method comprising:
receiving signals from said first unmanned vehicle;
operating an unmanned vehicle control module to control at least said first unmanned vehicle;
operating a first vehicle simulator control module used to control a first vehicle simulator, said first vehicle simulator including a first operator position and a first control interface, operating a first vehicle simulator control module including:
receiving input used to control said first unmanned vehicle; and
controlling movement of the first operator position in at least two dimensions to control motion of the operator position a full 360 degrees along at least two perpendicular axis in a manner simulating motion of the unmanned vehicle being controlled.

12. The method of claim 11, wherein operating an unmanned vehicle control module to control at least said first unmanned vehicle includes:
controlling a transmitter to transmit vehicle control signals to said first unmanned vehicle.

13. The method of claim 11, further comprising:
storing vehicle simulator information;
receiving operator input from a first operator via a first control interface of said first vehicle simulator; and
wherein controlling movement of the first operator position includes controlling movement of the first operator position based on a signal received from the first unmanned vehicle including motion information indicating motion of the first unmanned vehicle.

14. The method of claim 11, wherein controlling movement of the first operator position further includes:
operating the first vehicle simulator control module to control movement of the first operator position based on movement the first unmanned vehicle is expected to perform in response to a control input from the first operator.

15. The method of claim 14, wherein said control of movement of the first operator position based on movement the first unmanned vehicle is expected to make occurs before a signal received from the first unmanned vehicle indicates that the expected movement occurred.

16. The method of claim 14, said first vehicle simulator control module controls movement of the first operator position based on both movement of the first unmanned vehicle detected by said first unmanned vehicle and the control signal from the first operator.

17. The method of claim 16, wherein controlling a transmitter to transmit vehicle control signals to said first unmanned vehicle includes controlling the transmitter to communicate commands to said first unmanned vehicle, said commands being generated by said unmanned vehicle control module based on operator input and unmanned vehicle feedback information.

18. The method of claim 11, wherein said unmanned vehicle control module, said first vehicle simulator, said transmitter and said receiver are mounted on a mobile vehicle.

19. The method of claim 18, further comprising:
operating a second vehicle simulator mounted on the mobile vehicle including the first vehicle simulator, the second vehicle simulator including a second operator position and a second control interface for controlling the first unmanned vehicle.

20. The method of claim 19, further comprising:
performing a control handoff operation including switching from the first operator position controlling the first unmanned vehicle to the second operator position controlling the first unmanned vehicle.

* * * * *